(12) United States Patent
Renken et al.

(10) Patent No.: US 6,417,988 B1
(45) Date of Patent: Jul. 9, 2002

(54) DISC CLAMP FOR A DISC DRIVE

(75) Inventors: Frederick Paul Renken, Boulder; Frederick Mark Stefansky, Longmont, both of CO (US)

(73) Assignee: Seagate Technologh LLC, Scotts Valley, VA (US)

(*) Notice: Subject to any disclaimer, the term of this patent is extended or adjusted under 35 U.S.C. 154(b) by 43 days.

(21) Appl. No.: 09/689,472

(22) Filed: Oct. 12, 2000

Related U.S. Application Data (60) Provisional application No. 60/158,843, filed on Oct. 12, 1999, and provisional application No. 60/158,845, filed on Oct. 12, 1999.

(51) Int. Cl.$^7$ .......................................... G11B 17/022
(52) U.S. Cl. .................................................. 360/99.12
(58) Field of Search ........................... 360/98.08, 99.05, 360/99.12; 369/270

(56) References Cited

U.S. PATENT DOCUMENTS

| | | | | |
|---|---|---|---|---|
| 4,639,802 A | | 1/1987 | Neubauer et al. ......... | 360/98.08 |
| 4,918,545 A | * | 4/1990 | Scheffel ................... | 360/98.08 |
| 5,101,306 A | | 3/1992 | Johnson .................... | 360/98.08 |
| 5,249,090 A | | 9/1993 | Fehse ....................... | 360/98.08 |
| 5,267,106 A | | 11/1993 | Brue et al. ............... | 360/98.08 |
| 5,426,548 A | | 6/1995 | Fujii et al. ............... | 360/98.08 |
| 5,486,961 A | | 1/1996 | Boutaghou et al. ...... | 360/99.12 |
| 5,490,024 A | | 2/1996 | Briggs et al. ............. | 360/99.12 |
| 5,528,434 A | | 6/1996 | Bronshvatch et al. .... | 360/98.08 |
| 5,663,851 A | | 9/1997 | Jeong et al. .............. | 360/98.08 |
| 5,731,928 A | | 3/1998 | Jabbari et al. ........... | 360/98.08 |
| 5,761,002 A | | 6/1998 | Moir et al. ............... | 360/98.08 |
| 5,790,346 A | * | 8/1998 | Fletcher ................... | 360/99.12 |
| 5,801,901 A | | 9/1998 | Bryan et al. ............. | 360/98.08 |
| 5,847,900 A | | 12/1998 | Iwabuchi ................. | 360/98.08 |
| 5,880,906 A | | 3/1999 | Lindrose .................. | 360/98.08 |
| 5,917,677 A | * | 6/1999 | Moir et al. ............... | 360/98.08 |
| 5,923,498 A | | 7/1999 | Moir et al. ............... | 360/98.08 |
| 6,282,054 B1 | * | 8/2001 | Luo ........................ | 360/98.08 |

* cited by examiner

*Primary Examiner*—David L. Ometz
(74) *Attorney, Agent, or Firm*—Merchant & Gould P.C.

(57) ABSTRACT

An apparatus and method for securing an information storage disc within a disc drive. A disc drive spindle motor assembly including a spindle and a hub portion extending radially outward from the spindle, the hub portion defining a top surface. An information storage disc is mounted on the hub portion, the information storage disc having a top surface. The assembly further includes an annular disc clamp forming a central aperture having a middle annular raised portion, an outer annular periphery portion, and at least one inner centering portion including an inner vertical peripheral surface. The central aperture of the disc clamp is sized to receive the spindle to allow the inner centering portion to center the disc clamp about the spindle, while the outer periphery engages the top surface of the information storage disc, and the middle annular raised portion extends above the top surface of the hub portion and is adapted to receive a downwardly directed force. A disc clamp retainer applying this force is connected to the spindle. The disc clamp retainer is fastened to the spindle and engages the middle annular raised portion of the disc clamp to transmit this force through the outer peripheral portion to the disc.

21 Claims, 6 Drawing Sheets

DISC CLAMP FOR A DISC DRIVE

RELATED APPLICATIONS

This application claims the priority of United States Provisional Patent Application Serial No. 60/158,843 entitled "AXISYMETRIC HARD DISC DRIVE (HDD) CLAMP AND RETAINER RING WITHOUT SCREWS" filed Oct. 12, 1999, and United States Provisional Patent Application Serial No. 60/158,845 entitled "HARD DISC DRIVE (HDD) CLAMP AND RETAINER RING WITH LOCATING FEATURE" filed Oct. 12, 1999.

FIELD OF THE INVENTION

This application relates to magnetic disc drives and more particularly to an improved disc drive clamp and disc drive spindle motor apparatus for mounting information storage disc within the disc drive.

BACKGROUND OF THE INVENTION

Disc drives are data storage devices that store digital data in magnetic form on a storage medium on a rotating information storage disc. Modern disc drives include one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g., a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Spindle motor assemblies often utilize a rotating spindle hub journaled to a non-rotatable spindle shaft. A disc clamp is typically secured to the rotating spindle hub to exert a downward axial force on the mounted information storage discs and disc spacers in order to securely fasten the discs and spacer together on the hub. Typically, the disc clamp is basically an annular leaf spring that is sized such that its outer rim exerts the downward force through a series of equally spaced screws positioned around the central portion of the clamp and torqued through holes in a central portion of the clamp into the spindle hub. The spaced radial positioning of the screws is beneficial for exerting a distributed clamping force on the stacked discs on the spindle assembly because the force is exerted at the periphery of the clamp in closer proximity to the mounted information storage discs and disc spacers. However, the screw is a discrete source of the clamping force, thus the distribution of the downward force around the periphery of the clamp, against the adjacent disc is exerted in a non-uniform manner. Non-uniform clamping force can generally cause variations in the load force applied and, as a result, can cause the top mounted information storage disc to be physically distorted. Distortion of the top disc, even by as little as 100 micro inches, can lead to generation of unacceptable operational errors during recording and reproduction of data on the information storage disc.

In a second type of spindle motor assembly the spindle shaft and spindle hub portion both rotate about a bearing sleeve. Here, a single screw can be used to secure the disc clamp to the rotating spindle shaft because the shaft rotates with the screw (as opposed to the non-rotatable shaft where a plurality of screws must be positioned in the hub about the shaft). However, in order to develop a clamping force with a single screw similar to the force developed by the plurality of screws surrounding the non-rotatable shaft, it is necessary to apply a much higher torque to the single screw. This relatively high torque requirement can lead to a number of problems including over-stressing the spindle shaft bearing, stripping threads, and the generation of particles during the torquing process. These high-torque related problems can damage the bearing and lead to failure of the spindle motor.

Some screw-less disc clamps have been developed in attempts to overcome these shortcomings, but without completely satisfactory results. Often, such screw-less clamps are complicated, and difficult and expensive to manufacture and use. One problem in many screw-less disc clamps is the inability to provide a simple and easy to use mechanism by which a disc clamp can be centered about the spindle to provide a generally uniform clamping force.

Currently, there is a need in the relevant art to overcome the shortcomings of the traditional single screw disc drive spindle motor assembly, as well as the non-rotatable multiple screw spindle shaft spindle motor. There is also a need in the art to overcome the shortcomings of the screw-less disc clamp technology that currently exists.

Summary of the Invention

Against this backdrop the present invention has been developed. The present invention is an apparatus and method for uniformly retaining information storage discs onto a spindle motor in a disc drive.

In accordance with one preferred embodiment, the invention is implemented as a disc drive spindle motor assembly including a spindle and a hub portion extending radially outward from the spindle, the hub portion defining a top surface. An information storage disc is mounted on the hub portion, the information storage disc having a top surface. The assembly further includes an annular disc clamp forming a central aperture, having a middle annular raised portion, an outer annular peripheral portion, and at least one inner centering portion including an inner vertical peripheral surface. The central aperture of the disc clamp is sized to receive the spindle to allow the inner centering portion to center the disc clamp about the spindle, while the outer peripheral portion engages the top surface of the information storage disc, and the middle annular raised portion extends above the top surface of the hub portion and is adapted to receive a downwardly directed force. A disc clamp retainer applying this force is connected to the spindle. The disc clamp retainer is fastened to the spindle and engages the middle annular raised portion of the disc clamp to transmit this force through the outer peripheral portion to the disc.

The invention can be implemented in accordance with another preferred embodiment as a disc clamp having several discrete tabs forming the inner centering portion adapted to center the disc clamp on the spindle.

These and various other features as well as advantages which characterize the present invention will be apparent from a reading of the following detailed description and a review of the associated drawings.

DETAILED DESCRIPTION

Figure 1:
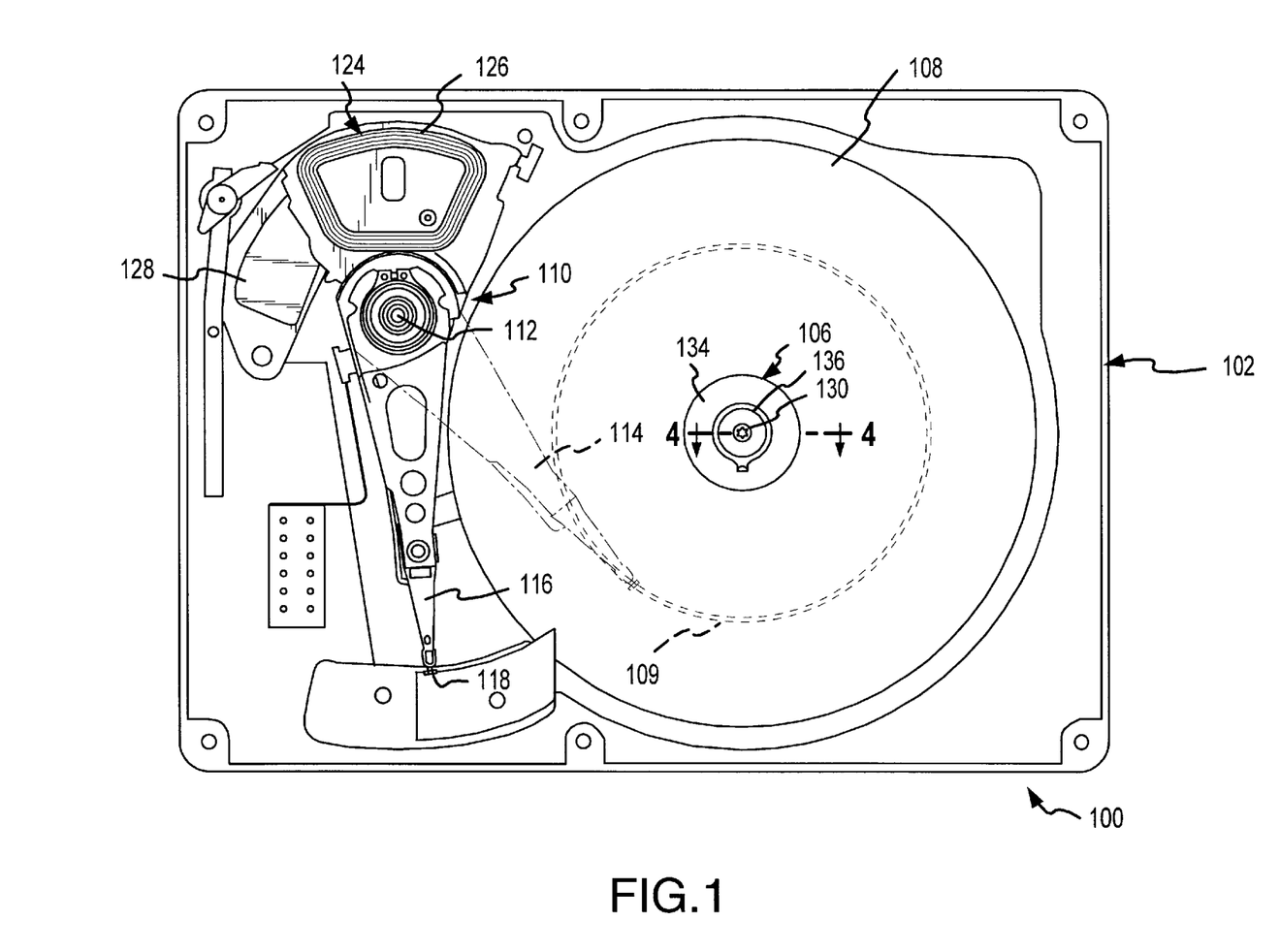
FIG. 1 is a top plan view of a disc drive, with its top cover removed, incorporating a disc clamping assembly in accordance with a preferred embodiment of the present invention.

A disc drive 100 constructed in accordance with a preferred embodiment of the present invention is shown in FIG. 1. The disc drive 100 includes a base plate 102 to which various components of the disc drive 100 are mounted. A top cover (not shown) cooperates with the base 102 to form an internal, sealed environment for the disc drive 100 in a conventional manner. The components include a disc drive motor 106 that rotates one or more information storage discs 108 at a constant high speed. The disc drive spindle motor 106 rotates a spindle 130 on a bearing sleeve (not shown). The spindle carries the one or more information storage discs 108, a disc clamp 134 and a disc clamp retainer 136. The spindle 130, and therefore the one or more information storage discs 108, are rotated about the spindle axis of rotation by the spindle motor 106, as is generally known in the art.

Information is written to and read from tracks 109 on the discs 108 through the use of an actuator assembly 110 which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider (not shown) enabling the head 118 to fly in close proximity above the corresponding surface of the associated information storage disc 108.

The radial position of the heads 118 is controlled through the use of a voice coil motor (VCM) 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

Figure 4:
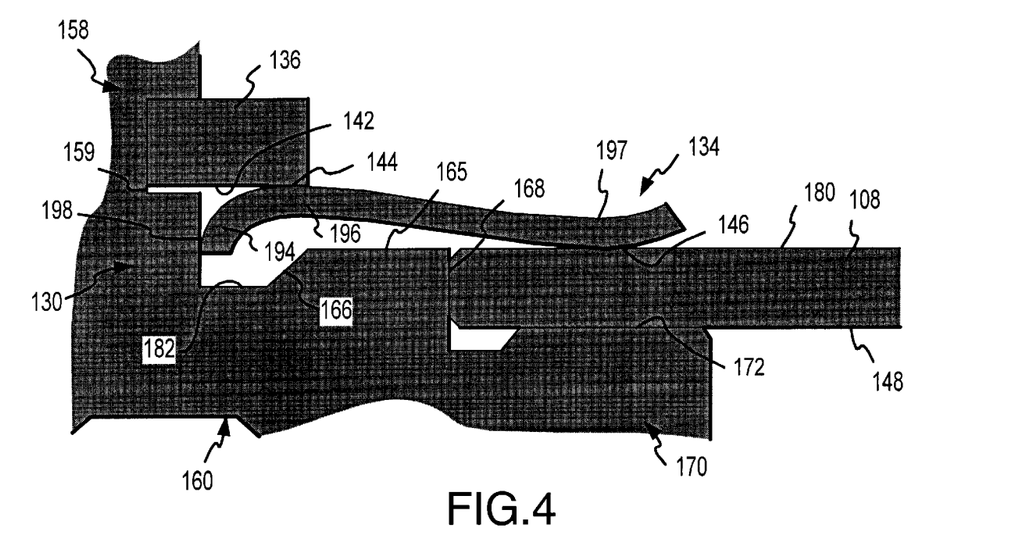
FIG. 4 is a sectional view through a portion of the disc clamping assembly in accordance with the preferred embodiment of the present invention shown in FIG. 1 taken along lines 4—4 through the disc clamp and disc clamp retainer positioned on the disc drive spindle hub.

FIG. 4 is a partial cross sectional view of the drive motor assembly in the disc drive 100 taken along lines 4—4 in FIG. 1. The spindle 130 is a generally cylindrical body symmetrical about the spin axis. The spindle 130 has a top portion 158 including a annular groove 159 therein. The groove 159 is generally perpendicular to the spindle axis of rotation. The top portion 158 of the spindle 130 need only be of such length and size to effectively form the groove 159 such that the groove can mate with a disc clamp retainer 136 as is described in greater detail below.

An annular hub portion 160 extends radially outward from the spindle 130 below the top portion 158. The hub portion 160 has an annular, generally flat shoulder surface 165 that extends radially from a slanted interior annular shoulder 166 to a downwardly projecting peripheral shoulder 168. The bottom end of the peripheral shoulder 168 joins an annular flange 170 that has a generally flat disc loading surface 172 for receiving and supporting an information storage disc 108, or in some embodiments, a disc stack made up of a number of alternating discs 108 and spacer rings (not shown). Preferably, the flat surface 165 is substantially parallel to the loading surface 172 of the annular flange 170, although this is not required. An annular relief groove 182 is formed in the surface 165 adjacent to the top interior annular shoulder 166, surrounding the vertically extending portion of the spindle 130.

The information storage disc 108 is secured to the spindle 130 between the bottom annular flange 170 and an annular disc clamp 134 that is mounted around the top portion 158 of the spindle 130. The disc clamp 134 is held in position by a disc clamp retainer 136 that engages the spindle 130, preferably by mating with the annular groove 159. The disc clamp retainer 136 that mates with the groove 159 has an engagement surface 142, preferably flat, for interacting with an upper contact surface 144 of the disc clamp 134. The engagement surface 142 extends around the clamp 134 generally parallel to the loading surface 172 of the annular flange 170. The disc clamp retainer 136 can be a clip as shown in FIG. 1 or any of a broad variety of structural configurations designed to engage the groove 159 and press against the engagement surface 142 of the clamp 134. A conventional snap ring may also be used.

Figure 2:
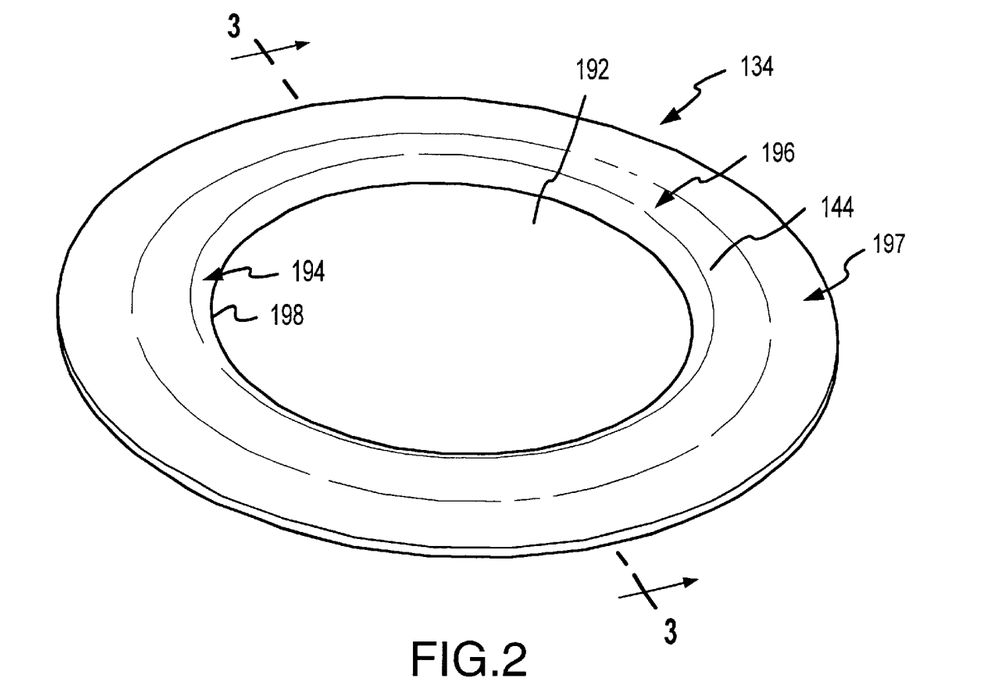
FIG. 2 is a separate perspective view of a disc clamp of the disc clamping assembly shown in FIG. 1.
Figure 3:
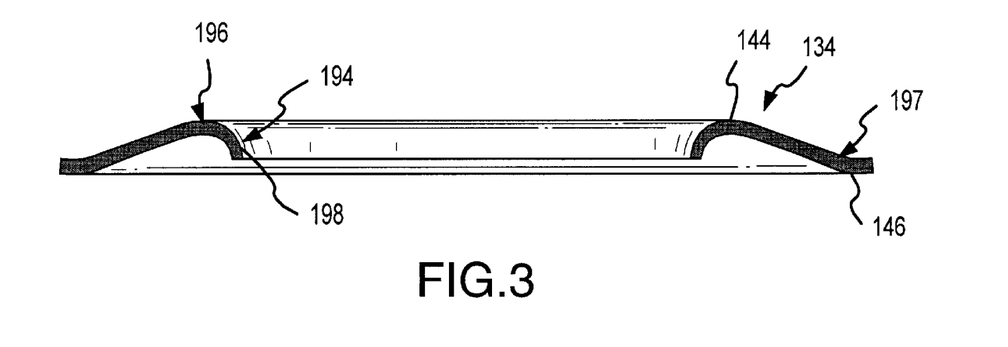
FIG. 3 is a sectional view of the disc clamp taken along lines 3—3 in FIG. 2.

The disc clamp 134, as shown in FIGS. 2 and 3, is generally an axisymmetric, ring shaped spring member that is preferably beveled or arched in cross sectional shape as shown in FIG. 3. The disc clamp 134 has a centrally located aperture 192, and includes an inner annular spindle contact or centering portion 194. The centering portion 194 has a downwardly projecting, inner peripheral surface or lip 198. The clamp 134 also includes a middle annular raised portion 196 having an upper contact surface 144, and an outer periphery 197 that includes a lower contact surface 146. Referring to FIG. 3, the disc clamp 134 in cross section is preferably beveled or arched in shape. Preferably, the shape is such that when the clamp 134 is laid on a generally flat horizontal surface, such as the loading surface 172 of the hub portion 160, the upper contact surface 144 of the raised portion 196 is on a higher horizontal plane than the outer periphery 197 having the lower contact surface 146. When laid on such a surface, opposed forces can be applied through the disc clamp 134 via the upper and lower contact surfaces 144 and 146. Preferably, when such forces are applied to the disc clamp 134, it is compressed such that the vertical distance between the upper contact surface 144 and the lower contact surface 146 is decreased.

Disc clamp 134 is preferably made from a resilient material such as a spring steel that can transfer a force between the upper and lower contact surfaces. Preferably, the disc clamp has a good degree of elasticity, such that the clamp can be compressed as discussed above, but will regain its original shape when the compression forces are removed. The clamp may be made from a metal, plastic, or other material having the desired spring rate characteristics. The clamp can be formed into the necessary shape using any methods generally known, depending upon the particular type of material being used. For example, a spring steel clamp may be stamped or formed from sheet metal.

Figure 5:
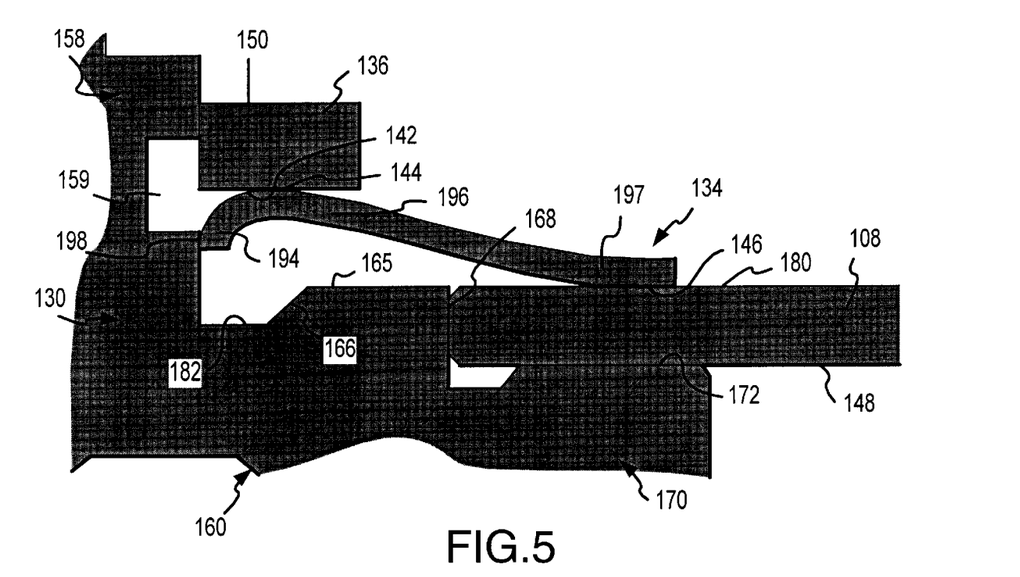
FIG. 5 is a sectional view as in FIG. 4 of a portion of the disc clamping assembly prior to engagement of the disc clamp retainer in the spindle groove on the disc drive spindle hub.

FIG. 4 illustrates the disc clamp 134 positioned over the top portion 158 of the spindle 130 and held in place by a retainer clip 136. As illustrated in FIG. 5, the disc clamp 134 is placed over the spindle 130. The inner annular spindle contact or centering portion 194 engages the spindle 130 and acts to center the disc clamp 134 about the spindle 130. The middle annular raised portion 196 extends radially across the spindle hub 160, preferably without contact with the hub. The outer peripheral portion 197 extends downward and outward over the information storage disc 108. The lower contact surface 146 of the peripheral portion 197 engages the top surface 180 of the information storage disc 108 at a position adjacent the spindle hub portion 160 and directly above the loading surface 172 of the annular flange 170 of the hub portion 160.

Once the disc clamp 134 is in position over the spindle 130, a predetermined downward pre-load force, shown as arrow 150, is applied symmetrically about the spindle axis to the middle annular raised portion 196. The pre-load force axially compresses the disc clamp 134 down on the mounted information storage disc 108. As the disc clamp 134 is compressed, the centering portion 194, including the downwardly projecting peripheral edge 198, bends down and extends within the annularly extending indentation 182, preferably without contact (See FIG. 4).

The pre-load force 150 can be supplied, for example, by air pressure, but may be supplied by other compression means. For example, the pre-load force 150 can be supplied by applying force to the retainer member 136 when inserting the retainer member 136 into the groove 159. It is envisioned that the pre-load force 150 be distributed symmetrically around the spindle motor axis of rotation and aligned with the axis of rotation. It is also envisioned that each spindle motor receive the same predetermined amount of pre-load force 150 thus ensuring little clamping force variation between spindle motor units.

Referring to FIG. 4, while the disc clamp 134 is in the compressed position on the spindle 130, the disc clamp retainer 136 is radially mated into the groove 159 in the spindle 130 to secure the pre-loaded disc clamp 134 to the mounted information storage disc 108. The engagement surface 142 of the retainer 136 engages the upper contact surface 144 of the disc clamp 134. The groove position, and the uniformly beveled or arched disc clamp shape control the compression of the disc clamp 134 providing the desired clamping force on the disc 108.

FIG. 4 shows the disc clamp 134 compressed between the substantially parallel surfaces of the disc clamp retainer shoulder surface 142 and the top surface 180 of the information storage disc 108. The disc 108 is therefore held in place between the lower contact surface 146 of the disc clamp 134 and the loading surface 172 of the annular flange 170. The orientation of the disc clamp 134 with the surfaces 142, 180 and 172, and the generally beveled or arched annular shape of the disc clamp 134 ensures that the disc clamp's distributed load is uniform and applied normal to the top surface 180 of the information storage disc 108. An equal and opposite reaction force, between bottom surface 148 of the information storage disc 108 and the loading surface 172 of the spindle hub annular flange 170, results from the application of this normal force. The two forces (normal and reaction) create a friction force in the plane of all mating surfaces which prevents the components on the drive motor 106 from shifting relative to each other when the disc drive 100 is in use or is subjected to high levels of shock and vibration.

Figure 6:
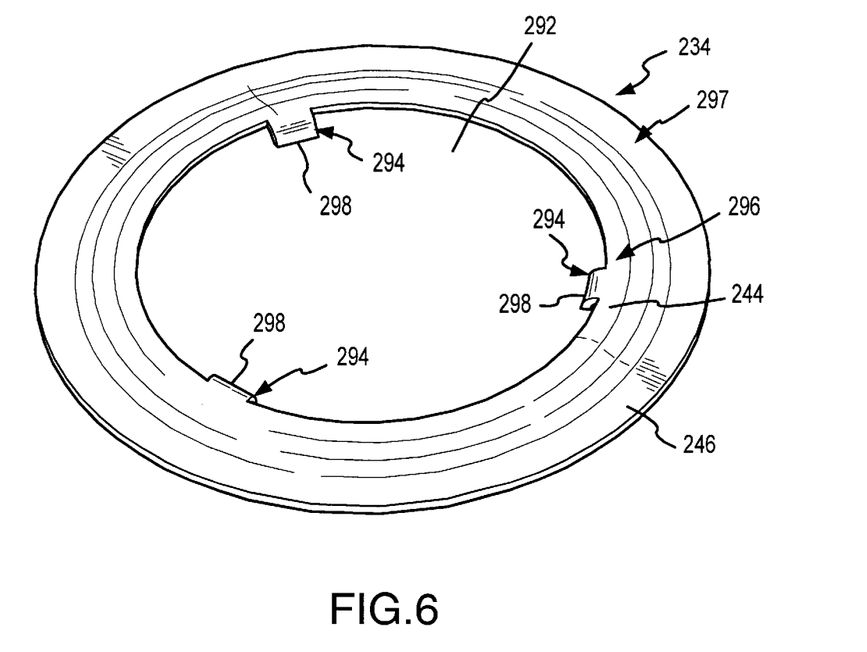
FIG. 6 is a perspective view of another preferred embodiment of a disc clamp in accordance with the present invention.
Figure 7:
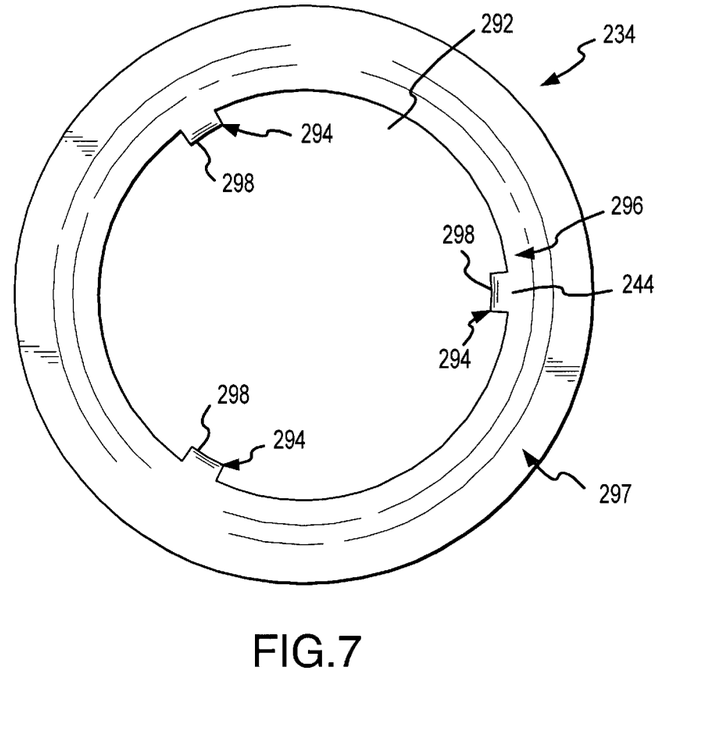
FIG. 7 is a plan view of the disc clamp shown in FIG. 6.

Referring now to FIGS. 6 and 7, a second preferred embodiment 234 of a disc clamp in accordance with the present invention is illustrated. The disc clamp 234, is similarly shaped to the disc clamp 134, in that it is generally described as a ring shaped member that is preferably beveled or arched in cross sectional shape. However, rather than having an inner annularly extending centering portion 194 as in the disc clamp 134, the disc clamp 234 has a plurality of inner spindle contact or centering tabs 294 that define downward projecting peripheral edges 298. Three centering tabs 294 are shown in FIGS. 6 and 7. However, it should be understood that additional, or fewer centering tabs 294 can be used in other embodiments. IN addition, other tab widths than illustrated may be utilized. The disc clamp 234 also defines a centrally located aperture 292, has a middle annular raised portion 296 having an upper contact surface 244, and an outer peripheral portion 297 that has a lower contact surface 246.

As with the disc clamp 134, the disc clamp 234 in cross section is preferably beveled or arched in shape. Preferably, the clamp shape is such that when the clamp 234 is laid on a generally flat horizontal surface, the raised portion 296 having the upper contact surface 244 is on a higher horizontal plane than the lower contact surface 246 of the outer peripheral portion 297. Opposed forces can be applied through the disc clamp 234 via the upper and lower contact surfaces 244 and 246 as in the first embodiment described above. Preferably, when such forces are applied to the installed disc clamp 234, the clamp is compressed such that the vertical distance between the upper contact surface 244 and the lower contact surface 246 is decreased.

Figure 8:
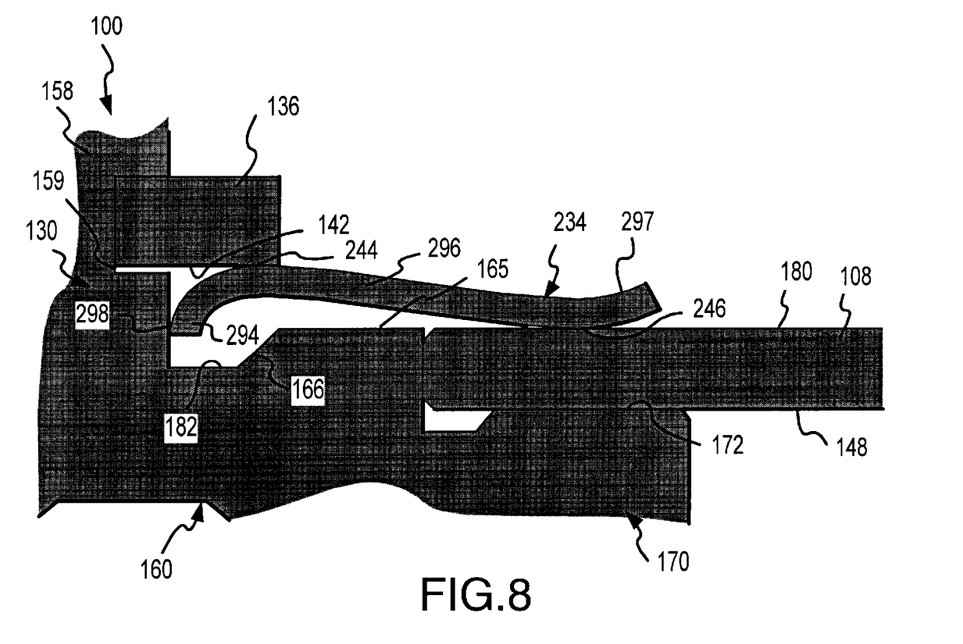
FIG. 8 is a sectional view of the disc clamp of FIG. 6 installed in the disc clamp assembly mounted on a drive motor spindle as in FIG. 1.

FIG. 8 illustrates a cross sectional view of the disc clamp 234 in use in the drive motor 106 of a disc drive 100. The cross section is taken such that it is through one of the tab portions 294 of the disc clamp 234. The disc clamp 234 is positioned over the top portion 158 of the spindle 130. The inner annular spindle contact or centering tabs 294 engages the spindle 130, and acts to center the disc clamp 234 about the spindle 130. The middle annular raised portion 296 of the disc clamp 234 extends radially outward over the spindle hub portion 160 without contact with the hub portion. The outer peripheral portion 297 extends down and over part of the information storage disc 108. The lower contact surface 246 engages the top surface 180 of the information storage disc 108 at a position adjacent the spindle hub portion 160 and directly above and in line with the annular flange 170 of the hub portion 160.

The disc clamp 234 is shown in a compressed position, with the centering tabs 194, including the downwardly projecting peripheral edges 198, extending within the annularly extending indentation 182, preferably without contact. The disc clamp retainer 136 is mated to groove 159 in the spindle 130 to maintain application of the compressive force to secure the disc clamp 234 in position on the spindle 130. The engagement surface 142 engages the upper contact surface 244 of the disc clamp 134.

FIG. 8 shows the disc clamp 234 compressed between the substantially parallel surfaces of the disc clamp retainer shoulder surface 142 and the top surface 180 of the information storage disc 108. The disc 108 is therefore held in place between lower contact surface 146 of the disc clamp 134 and the loading surface 172 of the annular flange 170. The orientation of the disc clamp 234 with the surfaces 142, 180 and 172, and the generally beveled or arched annular shape of the disc clamp 234 ensures that the disc clamp's distributed load is substantially uniform and applied normal to the top surface 180 of the information storage disc 108. An equal and opposite reaction force, between bottom surface 148 of the information storage disc 108 and the loading surface 172 of the spindle hub annular flange 170, results from application of the normal force. The two forces (normal and reaction) create a friction force in the plane of all mating surfaces which prevents the components on the drive motor 106 from shifting relative to each other when the disc drive 100 is in use or is subjected to high levels of shock and vibration.

Figure 9:
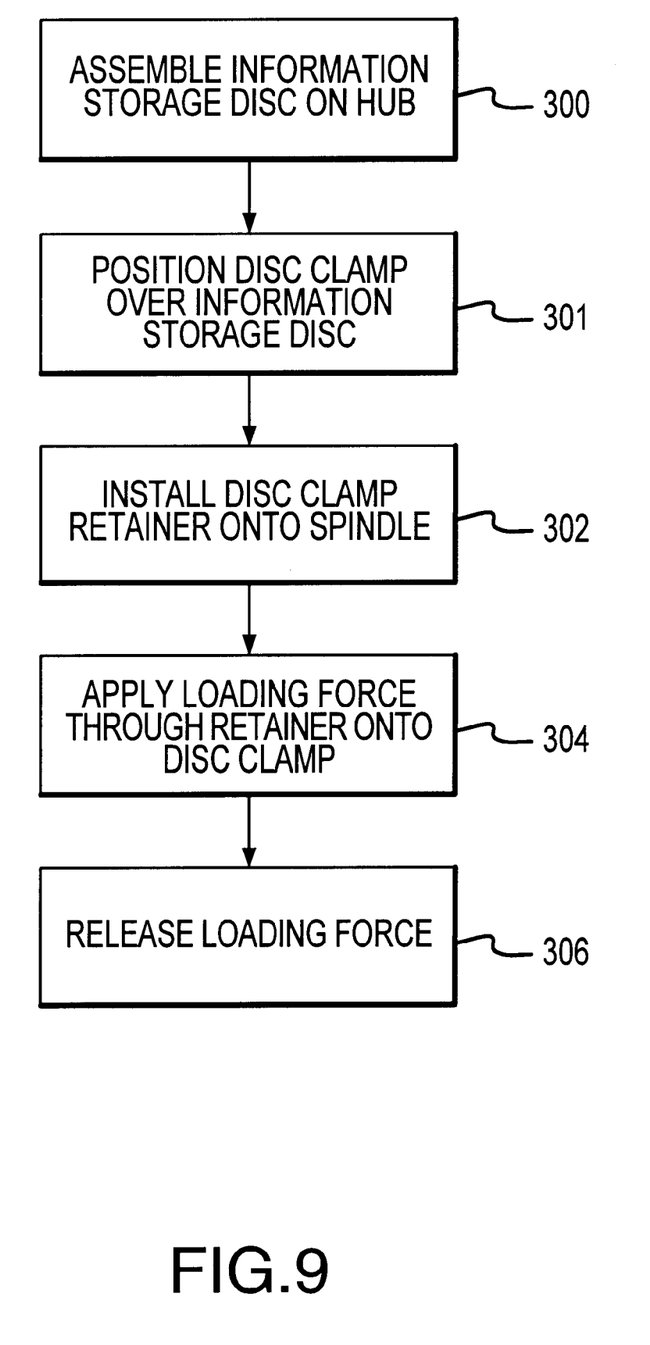
FIG. 9 is a is a flow chart showing the steps for assembling the disc clamping assembly in accordance with a preferred embodiment of the present invention.

FIG. 9 is a flow diagram showing the steps for installing and securing a disc clamp 134 on a disc drive spindle 130 utilizing the preferred embodiment of the present invention. In operation 300, the information storage disc 108 is assembled onto the hub portion 160 of the disc drive motor spindle 130 and positioned against the disc loading surface 172 of the flange 170. In operation 301, the disc clamp 134 or 234 is positioned over and generally centered on an information storage disc 108 on the spindle motor by the centering portion 194 or portions 294 of the disc clamp 134. In operation 302, a disc clamp retainer 136 is installed onto the spindle. In operation 304, a loading force is applied through the retainer 136 and to the disc clamp 134 in a direction normal to the information storage disc 108 so as to deflect the disc clamp 134 or 234 to a predetermined compressed position. As the retainer 136 is pushed down onto the clamp 134 and the clamp comprises, the retainer 136 engages the annular groove 159 to secure the retainer 136 to the spindle 130 and the disc clamp 134 at 136 onto the disc. Finally, in operation 306, the loading force on the retainer 136 is released from the retainer 136, and therefore also from the disc clamp 134. The predetermined force is maintained against the disc 108 by the disc clamp retainer 136 locked into the groove 159 thus maintaining the compression of the disc clamp 134.

The loading force or predetermined force discussed above may be applied by a tool pressing the retainer 136 down on the disc clamp 134 and the retainer 136 engaged in the groove 159 while the force is applied. This force essentially compresses the clamp 134 to a position where the retainer 136 may be slipped into the groove 159. When the loading force is removed, the retainer 136 maintains the clamp 134 in a compressed state, thus maintaining a retention force against the disc 108.

Therefore, the apparatus and method in accordance with the present invention includes applying an evenly distributed predetermined force to a disc clamp on a spindle motor. The spindle motor has a series of parallel surfaces that interact together under the force to ensure a uniform loading and consequent reaction force to secure the information storage disc on the spindle motor. The predetermined force ensures that the force and reaction force are aligned with the spindle axis of rotation and thus that the disc clamp is uniformly loaded onto the information storage disc.

In summary, the present invention may be viewed as a disc drive motor assembly (such as 106) that includes a spindle (such as 130) having a hub portion (such as 160) extending radially outward from the spindle (such as 130). The hub portion (such as 160) defines a top surface (such as 165). An information storage disc (such as 108) having a top surface (such as 180) is mounted on the hub portion (such as 160). A disc clamp (such as 134 or 234) having an inner centering portion (such as 198 and 298 defining) a central aperture (such as 192 or 292), a middle annular raised portion (such as 196 or 296) and an outer annular peripheral portion (such as 197 or 297). The inner centering portion (such as 194 or 294) centers the disc clamp (such as 134 or 234) about the spindle when the clamp is installed over the spindle. The outer peripheral portion (such as 197 or 297) engages the top surface (such as 180) of the information storage disc (such as 108), and the middle annular raised portion (such as 196 or 296) extends above the top surface (such as 165) of the hub portion (such as 160). A disc clamp retainer (such as 136) is fastened to the spindle (such as 130) over the disc clamp, the disc clamp retainer (such as 136) engaging and compressing the middle annular raised portion (such as 196 or 296) of the disc clamp (such as 134 or 234) to apply a clamping force through the peripheral portion of the clamp to the disc.

In one preferred embodiment, the at least one centering portion (such as 194) of the disc clamp (such as 134) comprises an annularly vertically projecting inner (such as 198). Further, the disc clamp (such as 134) including the centering portion (such as 194) can be axisymmetric in shape.

In another preferred embodiment, the centering portion (such as 294) comprises a plurality of centering tabs (such as 294) extending inwardly from the middle annular raised portion (such as 296) of the disc clamp (such as 134), each tab (such as 294) including a downwardly extending inner peripheral surface (such as 298).

In another preferred embodiments, the vertically projecting inner peripheral surface (such as 198 or 298) is downwardly extending toward the hub portion.

In another preferred embodiment, the hub portion (such as 160) defines an annular flange (such as 170), having a loading surface (such as 172) for receiving the information storage disc thereon and wherein the disc is secured between the disc clamp (such as 134 or 234) and the annular flange. In some such embodiments, the disc clamp retainer (such as 136) defines an engagement surface (such as 142) substantially parallel to the loading surface (such as 172) of the annular flange (such as 170), and the disc clamp (such as 134 or 234) is secured between the engagement surface of the disc clamp retainer and the top surface (such as 180) of the disc.

In another preferred embodiment, the spindle (such as 130) defines an annular groove (such as 159) therein reviewing a portion of the disc clamp retainer (such as 136).

In another preferred embodiment, the hub portion (such as 160) includes an annular indentation (such as 182) surrounding and adjacent the spindle (such as 130), and the vertically projecting inner peripheral surface (such as 198 or 298) of the inner centering portion (such as 194 or 294) extends into the annular indentation.

A further exemplary preferred embodiment of the invention includes a disc clamp (such as 134 or 234) for use in attaching an information storage disc (such as 108) to a disc drive spindle motor assembly (such as 106) having a spindle (such as 130). The disc clamp (such as 134 or 234) includes an annular member defining a centrally located aperture (such as 192 or 193) to be fitted over the spindle (such as 130), a middle annular raised portion (such as 196 or 296) having an upper contact surface (such as 144 or 244) adapted for contact with a disc clamp retainer (such as 136), and an outer annular peripheral portion (such as 197 or 297) having a lower contact surface (such as 146 or 246) adapted for contact with the disc (such as 108). The disc clamp (such as 134 or 234) includes an inner centering portion (such as 194 or 294) adapted to center the disc clamp (such as 134) on the spindle (such as 130), the centering portion (such as 194 or 294) having a vertically projecting inner peripheral surface (such as 198 or 298).

In one preferred embodiment, the centering portion (such as 194) includes an annular vertically projecting inner peripheral surface (such as 198). In some such embodiments, the disc clamp (such as 134 or 234) including the centering portion (such as 194 or 294) is axisymmetric in shape.

In another preferred embodiment, the centering portion (such as 294) comprises a plurality of centering tabs (such as 294) disposed about the middle annular raised portion (such as 296) of the disc clamp (such as 234), each tab (such as 294) including a vertically projecting inner peripheral surface (such as 298). In some embodiments, the disc clamp (such as 234) includes three or more centering tabs (such as 294).

In one preferred embodiment, the vertically projecting peripheral surface (such as 198 or 298) is downwardly projecting.

In one preferred embodiment, the cross sectional shape of the disc clamp (such as 134 or 234) is arched such that the raised middle portion (such as 196 or 296) having the upper contact surface (such as 144 or 244) is on a higher vertical plane than the outer periphery (such as 197 or 297) having the lower contact surface (such as 146 or 246).

In one preferred embodiment, the disc clamp (such as 134 or 234), when the clamp is compressed by force (such as 150) applied at the upper and lower contact surfaces (such as 144 and 244, and such as 146 and 246), the vertical distance between the upper contact surface (such as 144 and 244) and the lower contact surface (such as 144 and 244) is decreased.

In one preferred embodiment, the shape of the disc clamp (such as 134 and 234) is arched such that when a force (such as 150) is applied to the upper contact surface (such as 144 and 244), the force is transferred through the clamp to the lower contact surface (such as 144 and 244).

In yet another preferred embodiment, the disc clamp (such as 134 and 234) is made of an elastic material.

A further exemplary preferred embodiment of the invention includes a disc drive spindle motor assembly (such as 106) including an information storage disc (such as 108) mounted on a hub portion (such as 160) of a spindle (such as 130); and means for providing a uniform clamping force to a surface of the information storage disc to secure the disc to the hub.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art. For example, although the embodiments described above involve a single information storage disc being secured to a spindle hub, those of skill in the art, and others, will understand that the disc clamps and disc clamp assemblies of the invention can be used to secure multiple disc stacks to a spindle hub. For instance, annular disc spacers can be stacked between multiple information storage discs to form a disc stack, and the disc stack can be secured between the bottom annular flange of the hub and the disc clamp. The disc clamp would contact the top surface of the top disc in the stack, and the annular flange on the hub would contact the bottom surface of the bottom disc in the stack to secured the disc stack in position on the hub. The vertical distance between the bottom annular flange and the disc clamp would necessarily need to be increased as additional discs are added to the stack. Many other such modifications, changes and alternatives are also contemplated, and will be apparent to those of skill in the art. Accordingly, all such modifications, changes and alternatives are encompassed in the spirit of the invention disclosed and as defined in the appended claims.

What is claimed is:

1. A disc drive spindle motor assembly comprising:
   a spindle having an annular hub portion extending radially outward from the spindle, the hub portion defining a top surface for supporting an information storage disc mounted on the hub portion, the information storage disc having a top surface;
   a disc clamp having an inner centering portion defining a central aperture, a middle annular raised portion having an upper contact surface, and an outer annular peripheral portion having a lower contact surface, wherein the inner centering portion centers the disc clamp about the spindle when the disc clamp is installed over the spindle and the lower contact surface of the outer peripheral portion of the clamp engages the top surface of the information storage disc, and the middle annular raised portion extends above the top surface of the hub portion; and
   a disc clamp retainer fastened to the spindle over the disc clamp engaging and compressing the middle annular raised portion of the disc clamp reducing a vertical distance between the upper and lower contact surfaces to apply a clamping force through the peripheral portion of the clamp against the disc.

2. The assembly of claim 1, wherein the centering portion of the disc clamp comprises an annular vertically projecting inner peripheral surface.

3. The assembly of claim 2, wherein the disc clamp is axisymmetric in shape.

4. The assembly of claim 1, wherein the centering portion comprises a plurality of centering tabs extending inwardly from the middle annular raised portion of the disc clamp, each tab including a downwardly extending inner peripheral surface.

5. The assembly of claim 4, wherein the vertically projecting inner peripheral surface is downwardly extending toward the hub portion.

6. The assembly of claim 4, wherein the hub portion includes an annular indentation surrounding and adjacent the spindle and the vertically projecting inner peripheral surface of the inner centering portion extends into the annular indentation.

7. The assembly of claim 1, wherein the hub portion defines an annular flange having a loading surface for receiving the information storage disc thereon and wherein the disc is secured between the disc clamp and the annular flange.

8. The assembly of claim 7, wherein the disc clamp retainer defines an engagement surface substantially parallel to the loading surface of the annular flange; and the disc clamp is secured between the engagement surface of the disc clamp retainer and the top surface of the disc.

9. The assembly of claim 1, wherein the spindle has an annular groove therein receiving a portion of the disc clamp retainer.

10. The disc clamp of claim 1, wherein the shape of the disc clamp is arched such that when a force is applied to the upper contact surface, the force is transferred through the clamp to the lower contact surface.

11. A disc clamp for use in attaching an information storage disc to a disc drive spindle motor assembly having a spindle, the disc clamp comprising:

an annular member defining a centrally located aperture adapted to be fitted over the spindle, the annular member having a middle annular raised portion having an annular upper contact surface adapted for contact with a disc clamp retainer, and an outer annular peripheral portion having a lower contact surface adapted to contact the disc, and an inner centering portion adapted to center the disc clamp on the spindle, the centering portion having a vertically projecting inner peripheral surface, wherein when the clamp is compressed by force applied at the upper and lower contact surfaces, the vertical distance between the upper contact surface and the lower contact surface is decreased.

12. The disc clamp of claim 11, wherein the centering portion comprises an annular vertically projecting inner peripheral surface.

13. The disc clamp of claim 11, wherein the disc clamp including the centering portion is axisymmetric in shape.

14. The disc clamp of claim 11, wherein the centering portion comprises a plurality of centering tabs disposed about the middle annular raised portion of the disc clamp, each tab including a vertically projecting inner peripheral surface.

15. The disc clamp of claim 14, comprising three or more centering tabs.

16. The disc clamp of claim 11, wherein the vertically projecting peripheral surface is downwardly projecting.

17. The disc clamp of claim 11, wherein the cross sectional shape of the disc clamp is arched such that the raised middle portion having the upper contact surface is on a higher horizontal plane than the outer periphery having the lower contact surface.

18. A disc clamp for use in attaching an information storage disc to a disc drive spindle motor assembly having a spindle, the disc clamp comprising:

an annular member defining a centrally located aperture adapted to be fitted over the spindle, the annular member having a middle annular raised portion having an upper contact surface adapted for contact with a disc clamp retainer, and an outer annular peripheral portion having a lower contact surface adapted to contact the disc, and an inner centering portion adapted to center the disc clamp on the spindle, the centering portion having a vertically projecting inner peripheral surface, wherein the cross sectional shape of the disc clamp is arched such that the raised middle portion having the upper contact surface is on a higher horizontal plane than the outer periphery having the lower contact surface and wherein when the clamp is compressed by force applied at the upper and lower contact surfaces, the vertical distance between the upper contact surface and the lower contact surface is decreased.

19. A disc drive spindle motor assembly comprising:

an information storage disc mounted on a hub portion of a spindle; and screwless means for applying a uniform clamping force to a surface of the information storage disc to secure the disc to the hub.

20. The disc drive spindle motor assembly according to claim 19 wherein the spindle has a circular groove spaced from the hub potion; and the screwless means engages a portion of the spindle in the groove and compresses an annular clamp having a centering portion, a raised middle portion having an upper contact surface and an outer annular peripheral portion having a lower contact surface contacting the disc decreasing a vertical distance between the upper contact surface and the lower contact surface applying a uniform clamping force to a surface of the information storage disc to secure the disc to the hub.

21. The disc drive spindle motor assembly according to claim 19 wherein the screwless means compresses an annular clamp having a centering portion, a raised middle portion having an upper contact surface and an outer annular peripheral portion having a lower contact surface contacting the disc decreasing a vertical distance between the upper contact surface and the lower contact surface applying the uniform clamping force to the surface of the information storage disc to secure the disc to the hub.

* * * * *

UNITED STATES PATENT AND TRADEMARK OFFICE
CERTIFICATE OF CORRECTION

PATENT NO. : 6,417,988 B1
DATED : July 9, 2002
INVENTOR(S) : Renken et al.

It is certified that error appears in the above-identified patent and that said Letters Patent is hereby corrected as shown below:

<u>Title page,</u>
Item [73], Assignee, delete "Seagate Technologh LLC" and insert therefore -- Seagate Technology LLC --.

Signed and Sealed this

Sixth Day of May, 2003

JAMES E. ROGAN
*Director of the United States Patent and Trademark Office*